United States Patent
Shih et al.

(10) Patent No.: US 8,599,471 B2
(45) Date of Patent: Dec. 3, 2013

(54) ELECTRONIC PAPER DISPLAY DEVICE

(75) Inventors: Po-Sheng Shih, New Taipei (TW);
Jia-Shyong Cheng, New Taipei (TW);
Po-Yang Chen, New Taipei (TW)

(73) Assignee: Shih Hua Technology, Ltd., Zhubei, Hsinchu County (TW)

( * ) Notice: Subject to any disclaimer, the term of this patent is extended or adjusted under 35 U.S.C. 154(b) by 72 days.

(21) Appl. No.: 13/337,302

(22) Filed: Dec. 27, 2011

(65) Prior Publication Data

US 2013/0057943 A1  Mar. 7, 2013

(30) Foreign Application Priority Data

Sep. 2, 2011  (TW) .............................. 100131832 A

(51) Int. Cl.
*G02B 26/00* (2006.01)
(52) U.S. Cl.
USPC .......................................... 359/296; 359/290

(58) Field of Classification Search
USPC .................................................. 359/290–297
See application file for complete search history.

(56) References Cited

U.S. PATENT DOCUMENTS

2011/0242046 A1*  10/2011  Feng et al. ..................... 345/174
2012/0236392 A1*  9/2012  Shih et al. ..................... 359/296

FOREIGN PATENT DOCUMENTS

CN  101373305  6/2010

* cited by examiner

*Primary Examiner* — Mahidere Sahle
(74) *Attorney, Agent, or Firm* — Altis & Wispro Law Group, Inc.

(57) ABSTRACT

An electronic paper display device includes an electronic paper display panel, and a functional layer. The electronic paper display panel includes a common electrode layer and a display surface. The functional layer is located on the display surface and includes a carbon nanotube touching functional layer. A distance between the common electrode layer and the carbon nanotube touching functional layer is above 100 microns and equal to or less than 2 millimeters.

19 Claims, 10 Drawing Sheets

ELECTRONIC PAPER DISPLAY DEVICE

CROSS-REFERENCE TO RELATED APPLICATIONS

This application claims all benefits accruing under 35 U.S.C. §119 from Taiwan Patent Application No. 100131832, filed on Sep. 2, 2011, in the Taiwan Intellectual Property Office, the contents of which are hereby incorporated by reference. This application is related to a commonly-assigned application entitled, "ELECTRONIC PAPER DISPLAY DEVICE", filed Ser. No. 13/337,171, filed Dec. 26, 2011.

BACKGROUND

1. Technical Field

The disclosure generally relates to electronic paper display devices, and particularly, to a touch-control type electronic paper display device.

2. Description of Related Art

Electrophoretic electronic paper (e-Paper) displays have been widely used in electronic products such as mobile phones, electronic books, computers, and personal digital assistants. E-paper displays merits include low power consumption, flexibility, and are thin. E-paper display panels commonly include an upper electrode plate, a lower electrode plate, and an electrophoretic ink layer disposed between the upper electrode plate and the lower electrode plate. The upper electrode plate includes an upper substrate and a common indium tin oxide (ITO) electrode located on a lower surface of the upper substrate. The lower electrode plate includes a lower substrate and a thin film transistor (TFT) pixel electrode located on an upper surface of the lower substrate. The electrophoretic ink layer is located between the common ITO electrode and the TFT pixel electrode.

Typical e-paper display devices have a touch-control function. A conventional resistance type touch panel is directly adhered to an upper surface of the upper substrate. However, the e-paper display panels rely on the reflection of external light to display an image because they typically do not have a backlight apparatus. Therefore, the ITO conducting wires or metals in the laminated touch panel on the e-paper display panel will block a portion of the light, and greatly reduce the light reached to the e-paper display panel, thus affecting the displaying of the e-paper display panel.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 6:
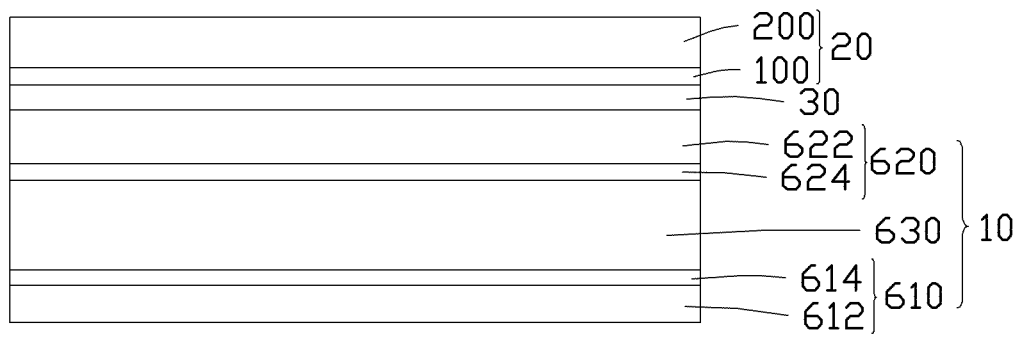
FIG. 6 is a schematic structural side view of an embodiment of an electronic paper display device.

Referring to FIG. 6, an embodiment of an electronic paper (e-paper) display device 500 includes an e-paper display panel 10 and a functional layer 20. The e-paper display panel 10 includes a display surface. The functional layer 20 is located on the display surface of the e-paper display panel 10. The functional layer 20 includes a carbon nanotube touching functional layer located on the display surface of the e-paper display panel.

The touch-control type e-paper display device 500, from bottom to top, can includes the electronic paper display panel 10, a first adhesive layer 30, and the functional layer 20. The first adhesive layer 30 is located between the e-paper display panel 10 and the functional layer 20 to adhere the e-paper display panel 10 with the functional layer 20. In this disclosure, "top" is a direction near a user, and "bottom" is a direction away from the user.

The functional layer 20 includes a carbon nanotube touch functional layer 100. The carbon nanotube touch functional layer 100 is adhered by the first adhesive layer 30 to a display surface of the e-paper display panel 10. The e-paper display panel 10 includes a common electrode layer 624 (i.e., an upper electrode layer). A distance between the common electrode layer 624 and the carbon nanotube touching functional layer 100 is greater than 100 microns. In one embodiment, the distance between the common electrode layer 624 and the carbon nanotube touching functional layer 100 is greater than 125 microns, and in another embodiment, the distance is greater than 175 microns.

Figure 1:
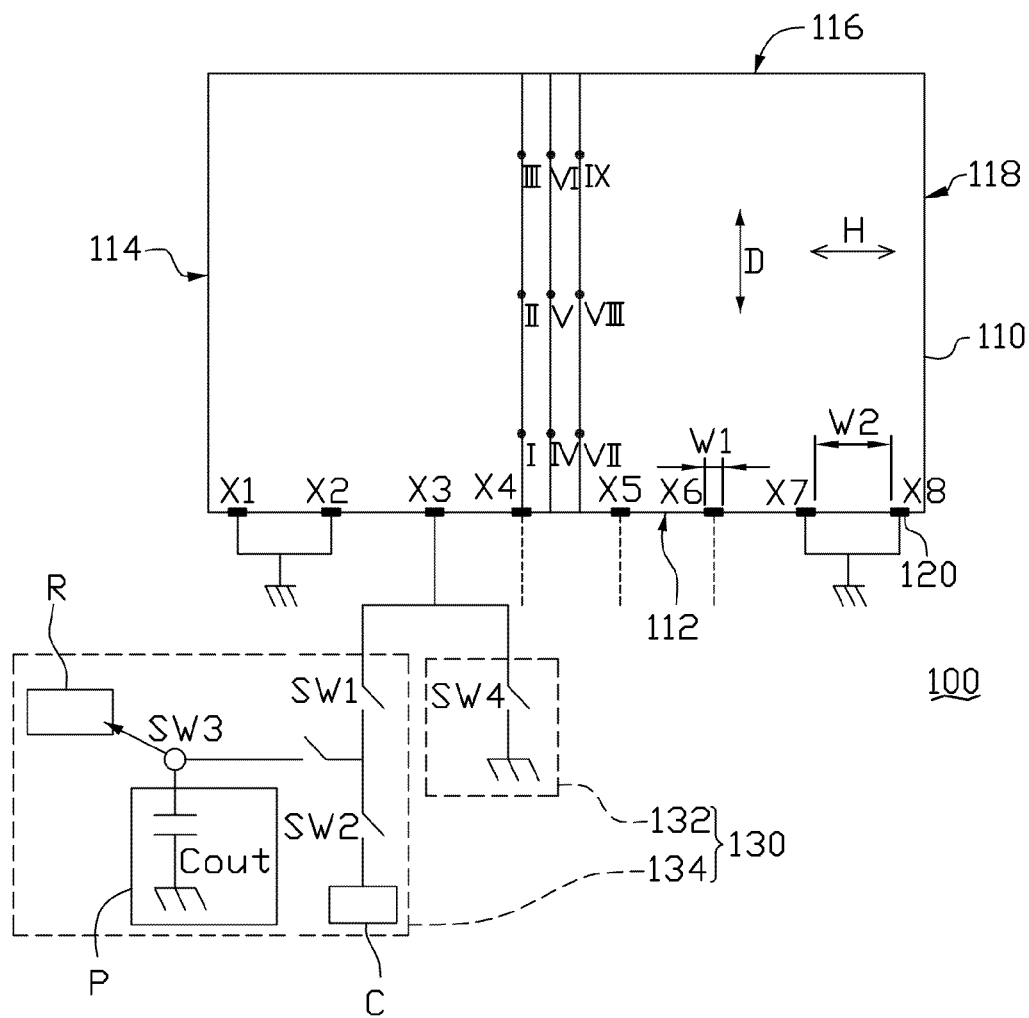
FIG. 1 is a schematic view of an embodiment of a carbon nanotube touching functional layer.

The carbon nanotube touching functional layer 100 is a sheet-shaped structure having a touch panel function. Referring also to FIG. 1, the carbon nanotube touching functional layer 100 includes one or more carbon nanotube films 110 and a plurality of driving-sensing electrodes 120. The plurality of driving-sensing electrodes 120 are electrically connected to the carbon nanotube film 110.

In one embodiment, the carbon nanotube touching functional layer 100 is laminated with the first adhesive layer 30. The carbon nanotube touching functional layer 100 directly covers the first adhesive layer 30. The touch-sensing function of the carbon nanotube touching functional layer 100 can be realized by only having the plurality of driving-sensing electrodes 120 and the one or more carbon nanotube films 110.

The carbon nanotube film 110 includes a plurality of carbon nanotubes. The plurality of carbon nanotubes are substantially aligned along a same direction so that the carbon nanotube film 110 has a maximum electrical conductivity at the aligned direction of the carbon nanotubes which is greater than at other directions. The carbon nanotube film 110 can be formed by drawing from a carbon nanotube array. The overall aligned direction of a majority of the carbon nanotubes in the carbon nanotube film 110 is substantially aligned along the same direction and parallel to a surface of the carbon nanotube film 100. The carbon nanotube is joined to adjacent carbon nanotubes end to end by van der Waals attractive force therebetween, and the carbon nanotube film 110 is capable of being a free-standing structure. A support having a large surface area to support the entire free-standing carbon nanotube film 110 is not necessary, and only a supportive force at opposite sides of the film 110 is sufficient. The free-standing carbon nanotube film 110 can be suspended and maintain its own film state with only supports at the opposite sides of the film 110. When disposing (or fixing) the carbon nanotube film 110 between two spaced supports, the carbon nanotube film 110 between the two supports can be suspended while maintaining its integrity. The successively and aligned carbon nanotubes joined end to end by van der Waals attractive force in the carbon nanotube film 110 is the main reason for the free-standing property. The carbon nanotube film 110 drawn from the carbon nanotube array has a good transparency. In one embodiment, the carbon nanotube film 110 is substantially a pure film and consists essentially of carbon nanotubes, to increase the transparency of the touch panel, the carbon nanotubes are not functionalized.

Figure 7:
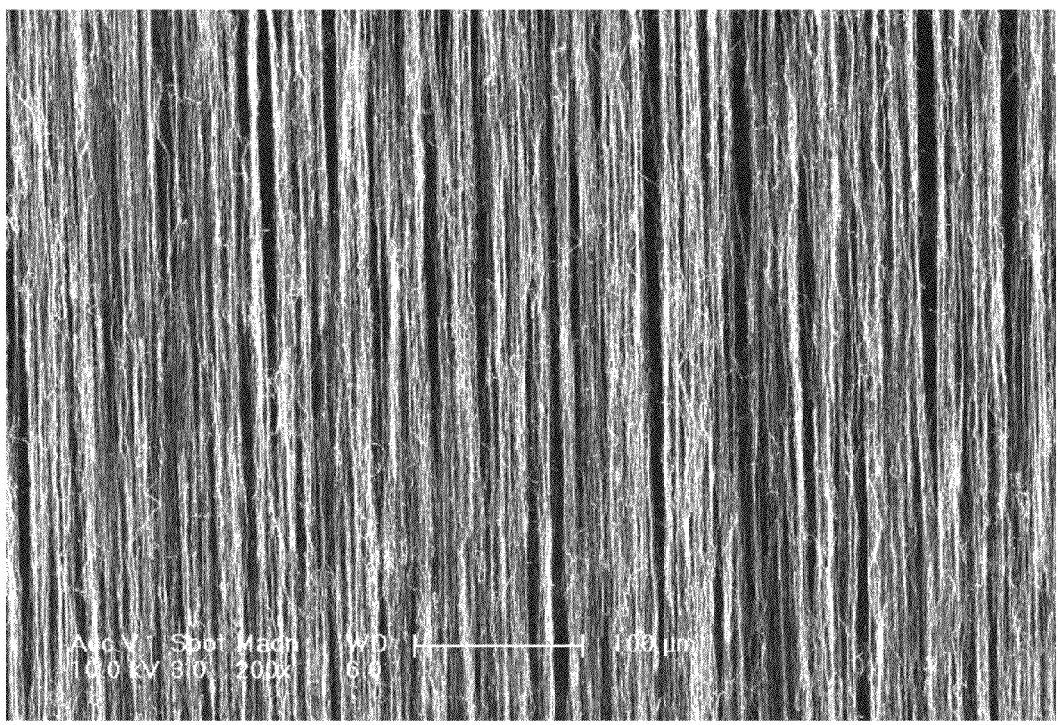
FIG. 7 is a scanning electron microscope (SEM) photo of an embodiment of a carbon nanotube film.

Referring to FIG. 7, the carbon nanotube film 110 includes a plurality of substantially parallel carbon nanotube wires, and the carbon nanotube wire includes a plurality of carbon nanotubes aligned substantially along the same direction. The carbon nanotube film 110 can be a free-standing structure consisting of a plurality of carbon nanotubes. The plurality of carbon nanotubes have a preferred orientation along the same direction. The preferred orientation means that the overall aligned direction of the majority of carbon nanotubes in the carbon nanotube film 110 is substantially along the same direction. The overall aligned direction of the majority of carbon nanotubes is substantially parallel to the surface of the carbon nanotube film 110. The majority of carbon nanotubes are joined end to end therebetween by van der Waals attractive force. More specifically, the majority of carbon nanotubes are substantially aligned along the same direction in the carbon nanotube film 110, each carbon nanotube is joined to adjacent carbon nanotubes at the aligned direction of the carbon nanotubes end to end by van der Waals attractive force. There may be a minority of carbon nanotubes in the carbon nanotube film 110 that are randomly aligned, but the number of randomly aligned carbon nanotubes is very small compared to the majority of substantially aligned carbon nanotubes and therefore will not affect the overall alignment of the majority of carbon nanotubes in the carbon nanotube film 110.

In the carbon nanotube film 110, the majority of the carbon nanotubes that are substantially aligned along the same direction are not completely straight. Sometimes, the carbon nanotubes can be curved or not exactly aligned along the overall aligned direction, and can deviate from the overall aligned direction by a certain degree. Therefore, it cannot be excluded that partial contacts may exist between the juxtaposed carbon nanotubes in the majority of carbon nanotubes aligned along the same direction in the carbon nanotube film 110. Despite having curved portions, the overall alignment of the majority of the carbon nanotubes are substantially aligned along the same direction.

Figure 8:
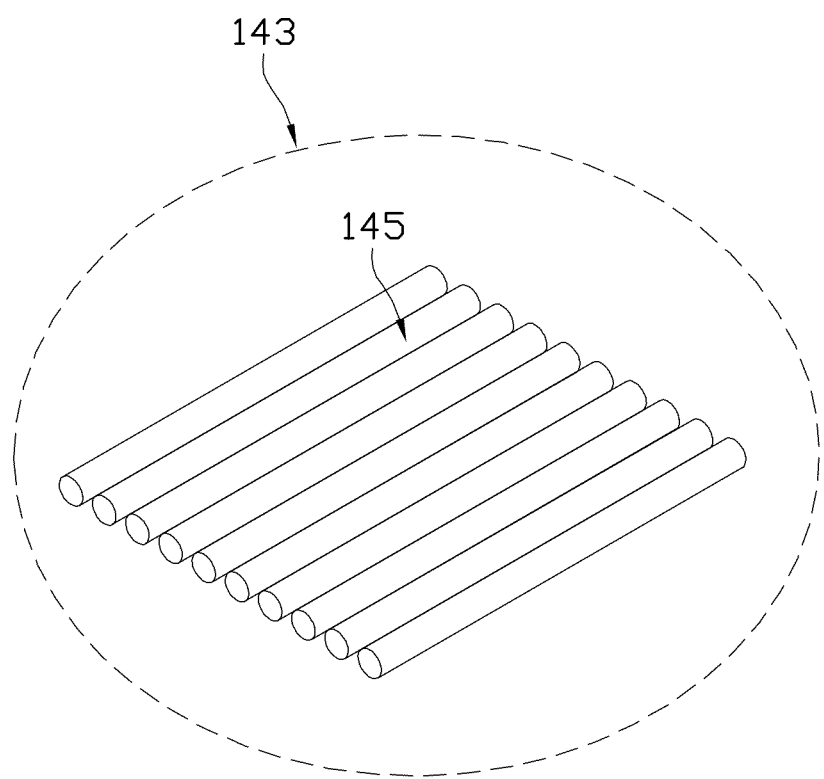
FIG. 8 is a schematic structural view of a carbon nanotube segment of the carbon nanotube film.

Referring to FIG. 8, the carbon nanotube film 110 includes a plurality of successive and oriented carbon nanotube segments 143. The plurality of carbon nanotube segments 143 are joined end to end by van der Waals attractive force. Each carbon nanotube segment 143 includes a plurality of carbon nanotubes 145 substantially parallel to each other, and the plurality of paralleled carbon nanotubes 145 are in contact with each other and combined by van der Waals attractive force therebetween. The carbon nanotube segment 143 has a desired length, thickness, uniformity, and shape. The carbon nanotubes 145 in the carbon nanotube film 110 have a preferred orientation along the same direction. The carbon nanotube wires in the carbon nanotube film 110 can consist of a plurality of carbon nanotubes joined end to end. The adjacent and juxtaposed carbon nanotube wires can be connected by randomly aligned carbon nanotubes. There can be clearances between adjacent and juxtaposed carbon nanotubes in the carbon nanotube film 110. A thickness of the carbon nanotube film 110 at the thickest location is about 0.5 nanometers to about 100 microns (e.g., in a range from 0.5 nanometers to about 10 microns).

A method for drawing the carbon nanotube film 110 from the carbon nanotube array includes: (a) selecting a carbon nanotube segment 143 from a carbon nanotube array by using a drawing tool, such as an adhesive tape or adhesive substrate bar contacting the carbon nanotube array to select the carbon nanotube segment 143; (b) moving the drawing tool and drawing the selected carbon nanotube segment 143 at a certain speed, such that a plurality of carbon nanotube segments 143 are drawn joined end to end, thereby forming a successive carbon nanotube film 110. The plurality of carbon nanotubes of the carbon nanotube segment 143 are juxtaposed to each other. While the selected carbon nanotube segment 143 gradually separates from the growing substrate of the carbon nanotube array along the drawing direction under the drawing force, the other carbon nanotube segments 143 that are adjacent to the selected carbon nanotube segment 143 are successively drawn out end to end under the action of the van der Waals attractive force, thus forming a successive and uniform carbon nanotube film 110 having a preferred orientation.

The carbon nanotube film 110 has a unique impedance property because the carbon nanotube film 110 has a minimum electrical impedance in the drawing direction, and a maximum electrical impedance in the direction perpendicular to the drawing direction, thus has an anisotropic impedance property. The carbon nanotube touching functional layer 100 can detect multiple points at the same time because of the anisotropic impedance property. A relatively low impedance direction D is the direction substantially parallel to the aligned direction of the carbon nanotubes, and a relatively high impedance direction H is substantially perpendicular to the aligned direction of the carbon nanotubes The carbon nanotube film 110 can have a rectangular shape with four side edges 112, 114, 116, 118. The side edge 112 and side edge 116 are opposite to each other and substantially parallel to the relatively high impedance direction H. The side edge 114 and side edge 118 are opposite to each other and substantially parallel to the relatively low impedance direction D. In one embodiment, a ratio between the impedance at the high impedance direction H and the impedance at the low impedance direction D of the carbon nanotube film 110 is equal to or greater than 50 (e.g., in a range from 70 to 500).

The carbon nanotube touching functional layer 100 can include a plurality of carbon nanotube films 110, laminated to each other or arranged side to side. The length and width of the above described e-paper display device are not limited. In addition, the carbon nanotube film 110 can have a transmittance of visible light above 85%.

The plurality of driving-sensing electrodes 120 are arranged on the side edge 112 of the carbon nanotube film 110. In one embodiment, each driving-sensing electrode 120 is connected to one carbon nanotube wire or a plurality of adjacent carbon nanotube wires. A length W1 along the relatively high impedance H of each driving-sensing electrode 120 can be between about 1 mm to about 8 mm. A distance W2 between adjacent driving-sensing electrodes 120 can be between about 3 mm to about 5 mm. A signal input by each driving-sensing electrode 120 to the carbon nanotube film 110 or received from the carbon nanotube film 110 will transmit primarily along the relatively low impedance direction D.

The directional characteristic of the signal transmittance in the carbon nanotube touching functional layer 100 can be used as a determining basis of a touch location. It is to be understood that the size and pitch of the driving-sensing electrodes 120 can change depending on the desired resolution and application.

The carbon nanotube touching functional layer 100 can further include one or more driving circuits 130. The driving circuit 130 is connected to one or more of the driving-sensing electrodes 120. The driving circuit 130 can have different kinds of components and connections. One electrical circuit design will be illustrated as an example, and not to be construed as a limit to the present disclosure. In one embodiment, the carbon nanotube touching functional layer 100 includes a single driving circuit 130 connected to each of the driving-sensing electrodes 120 one by one using a multiplexer, or some other component and configuration. In another embodiment, the carbon nanotube touching functional layer 100 includes a plurality of driving circuits 130, and each of the driving circuits 130 is connected to each of the driving-sensing electrodes 120 in a one to one manner or in a one to more manner. FIG. 1 illustrates an example of the driving circuit 130 connected to one driving-sensing electrode 120. However, at least a plurality of or all the driving-sensing electrodes 120 can be connected to the driving circuit 130.

In one embodiment, the driving circuit 130 includes a grounding unit 132 and a scanning unit 134. The scanning unit 134 includes a charging circuit C, a storage circuit P, and a readout circuit R. The charging circuit C and the storage circuit P are connected in parallel, and the readout circuit R is connected to the storage circuit P.

In one embodiment, the driving circuit 130 has four switches SW1, SW2, SW3, and SW4. The switch SW1 controls the electrical connection between the charging circuit C, the storage circuit P, and the readout circuit R in the scanning unit 134 to the driving-sensing electrode 120. The switch SW2 controls the connection between the charging circuit C to the switch SW1. The switch SW3 controls the connection between the storage circuit P and the readout circuit R to the switch SW1. The switch SW4 is arranged in the grounding unit 132 and controls grounding the driving-sensing electrode 120.

In one embodiment, the driving mode of the carbon nanotube touching functional layer 100 is progressive scanning the driving-sensing electrodes 120 to receive the signals from the scanned driving-sensing electrodes 120. The progressive scanning means that the driving-sensing electrodes 120 are scanned by the scanning unit 134 group by group or one by one. During the scanning of one driving-sensing electrode 120, the driving-sensing electrode 120 is electrically connected to the scanning unit 134. When one or more of the driving-sensing electrodes 120 is electrically connecting to the scanning unit 134, all the other groups or other driving-sensing electrodes 120 are electrically connected to the grounding unit 132. A scanning order does not depend on the location of the driving-sensing electrodes 120. For example, the driving-sensing electrodes 120 in FIG. 1 can be scanned from left to right, from right to left, with one interval, with several intervals, or randomly scanned.

The driving-sensing electrodes 120 of the carbon nanotube touching functional layer 100 can be orderly arranged electrode X1, electrode X2, electrode X3, electrode X4, electrode X5, electrode X6, electrode X7, and electrode X8. In one embodiment, the switch SW1 of the scanning unit 134 needs to be closed, and the switch SW4 of the grounding unit 132 needs to be open, before the electrode X3 can electrically connect to the scanning unit 134. The switch SW4 of the grounding unit 132 needs to be closed, and the switch SW1 of the scanning unit 134 needs to be open, before the electrode X3 can electrically connect to the grounding unit 132. The grounding unit 132 can be connected to a grounding electric potential or a fixed electric potential, or the grounding unit 132 itself can be a high impedance component.

Figure 2:
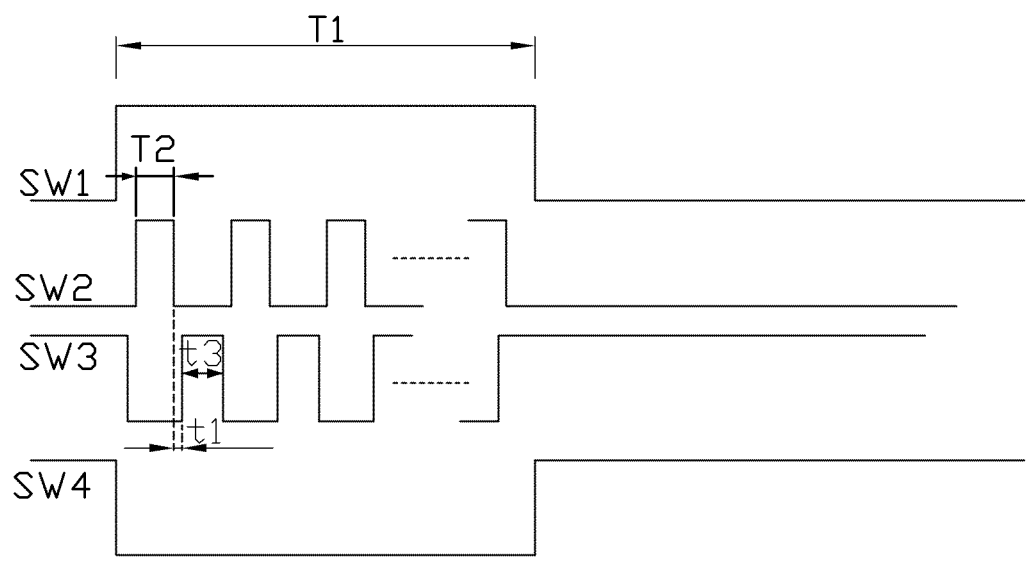
FIG. 2 is a driving waveform diagram during a scanning of one embodiment of switches of a driving circuit.

FIG. 2 is a driving waveform diagram during a scanning of one embodiment of the switches of a driving circuit. Referring to FIG. 2, the waveforms from top to bottom are the waveforms of switch SW1, switch SW2, switch SW3, and switch SW4. Time period T1 is the time when the scanning action is processed. The waveform may have a high level and a low level. The voltage of the waveform in the high level is higher than the voltage of the waveform in the low level. In the present embodiment, during the time period of a high level of each waveform, a corresponding switch SW1 to SW4 is closed (i.e., turn on), and during the time period of a low level of each waveform, a corresponding switch SW1 to SW4 is open (i.e., turn off).

Referring to FIG. 1 and FIG. 2, in the time period T1, the switch SW1 is closed, and the switch SW4 is open. Therefore, the corresponding driving-sensing electrode 120 is electrically connected to the scanning unit 134 to be scanned. In the time period T1, the switch SW2 and the switch SW3 alternate close and open. For example, in the time period T1, when the switch SW2 is closed, the switch SW3 is open, and when the switch SW3 is closed the switch SW2 is open, and alternating. In the present embodiment, the switch SW2 and the switch SW3 are closed at the time periods T2 and T3 respectively, and after the switch SW2 opens, the closing of the switch SW3 is delayed a delaying time period t1. Therefore, in the time period T1, the corresponding driving-sensing electrodes 120 will be alternately connected to the charging circuit C and the storage circuit P. In one embodiment, the time period T1 is about 20 microseconds, the time period T2 and the time period T3 are about 0.3 microseconds, and the time period t1 is about 0.025 microseconds. However, in some other driving modes, the time period T3 can nearly follow the time period T2, thus the time period t1 is about zero. The lengths of these time periods are decided by the capacity of the driving circuit 130 and the size of the actual product.

In the present embodiment, the charging circuit C connects to a voltage source (not shown), and the storage circuit P connects to an external capacitance Cout. When a user or a conductive medium touches the e-paper display device, a contact capacitance is formed between the carbon nanotube film 110 and the user or the conductive medium. At this time, the charging circuit C and the storage circuit P will alternately charge and discharge the contact capacitance. The readout circuit R can then read the charging amount of the contact capacitance during the time period T1, such as reading a voltage value, to be a determining basis of the touch location. The above described design is only one example of the driving circuit 130. In other embodiments, the driving circuit 130 can be composed by other functional components. That is to say, all circuit designs that can be connected to the driving-sensing electrodes 120 to determine the contact capacitance can be used by the driving circuit 130.

Referring to FIG. 1, in one simulation test, a contact area of each contact action is set, to be 5 mm×5 mm, and the external capacitance $C_{out}$ set in the storage circuit P is 100 pf. In this simulation test, nine touch locations are emulated. The center points of these touch locations are location I to location IX. Location I to location III are aligned with the electrode X4. Location IV to location VI are at locations respectively deviated from the location I to location III toward the electrode X5. Locations VII to locations IX are at locations respectively deviated from the location IV to location VI toward the electrode X5. In the present test, the distance between the location VII to location IX and the electrode X4 is set to be equal to the distance between the location VII to location IX and the electrode X5.

Figure 3:
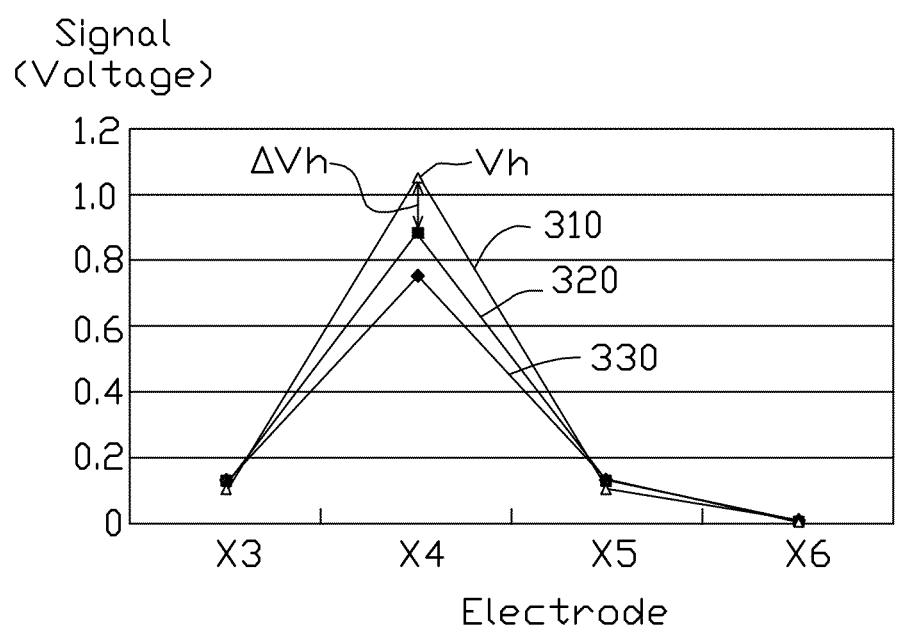
FIG. 3 to FIG. 5 show signals received by electrodes X3 to X6 in a simulation test.
Figure 4:
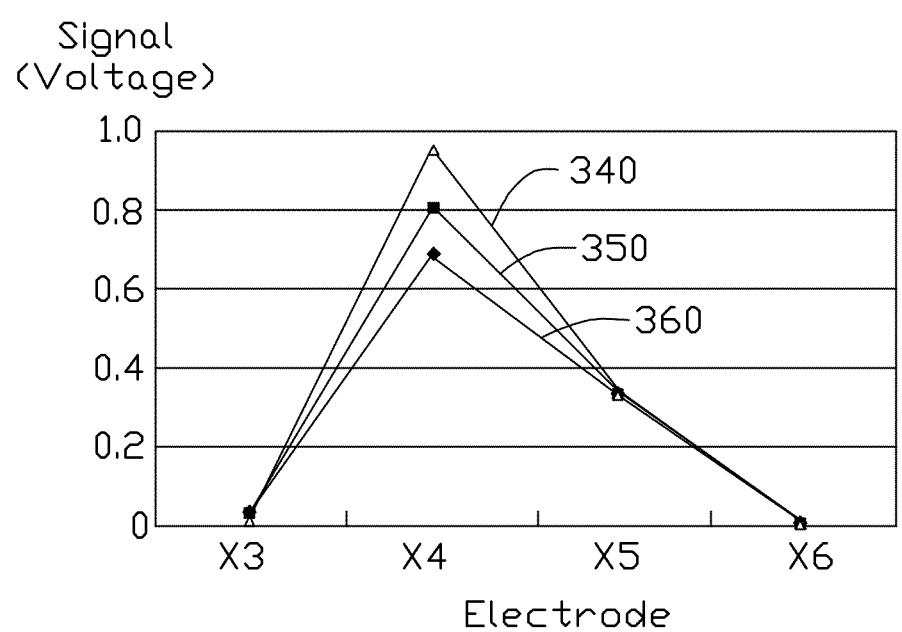
Figure 5:
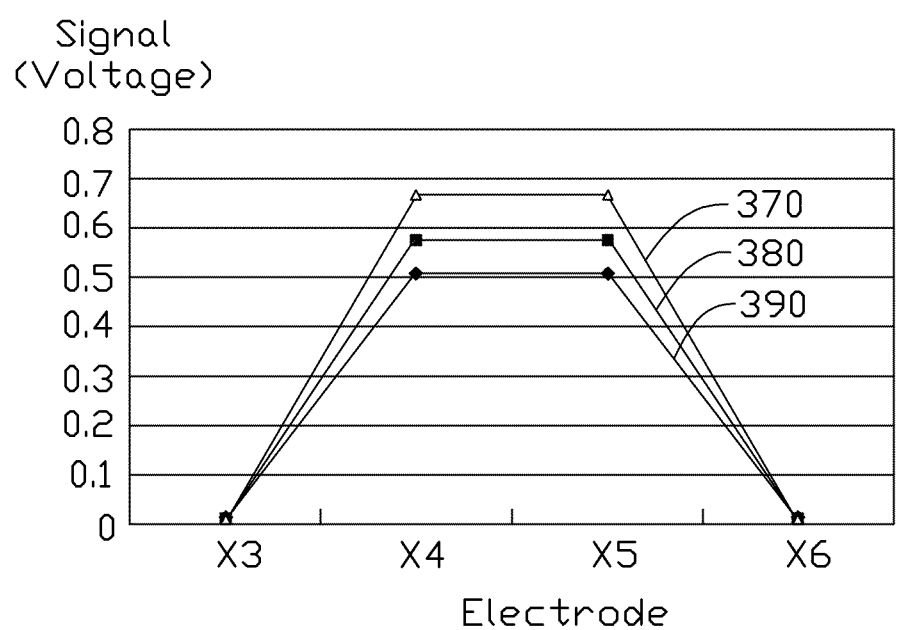

FIG. 3 to FIG. 5 show the signals received by the electrode X3 to X6 in the simulation test. Referring to FIG. 1 and FIG. 3, the carbon nanotube film 110 of the present embodiment has an anisotropic impedance property, thus the conducting path of a current is primarily parallel to the relatively low impedance direction D. When the location I is touched, the signal received by the electrodes X3 to X6 (i.e., the voltage read by the readout circuit R) is the polygonal chain 310 shown in FIG. 3. When the location II and the location III are touched, signals received by the electrodes X3 to X6 are respectively the polygonal chain 320 and polygonal chain 330 shown in FIG. 3.

Although the location I to location III are all aligned with the electrode X4, different signals can be produced. When the location III is touched, the signal received by the electrode X4 is the smallest. In the emulation, the closer the touch locations I to IX to the driving-sensing electrode 120, the greater the signal received by the corresponding driving-sensing electrode 120. Therefore, the carbon nanotube touch functional layer 100 can determine the coordinate at the relatively low impedance direction D of the touch location from the value of the signal received by the driving-sensing electrode 120.

Referring to FIG. 4, the polygonal chain 340 to polygonal chain 360 orderly are the signals received by the electrode X3 to the electrode X6 when the touch locations are at the location IV to location VI. As the location IV to location VI are deviated to the electrode X5 respectively compared with the location I to location III, the electrode X4 and the electrode X5 both can charge and discharge the contact capacitance. However, when the touch locations are at the location IV to location VI, the signals received by the electrode X4 is greater than the signals received by the electrode X5.

Similarly, referring to FIG. 5, the polygonal chain 370 to the polygonal chain 390 are the signals received by the electrode X3 to the electrode X6 when the touch locations are at the location VII to location IX. When the touch location is at one of the location VII to location IX, the electrode X4 and the electrode X5 can receive the same signals. It can be known from the signal relationship from FIG. 3 to FIG. 5 that the coordinate at the relatively high impedance direction H of the touch location can be determined by comparing the signals received by three adjacent driving-sensing electrodes 120. For example, to determine the coordinate at the relatively high impedance direction H of the touch location, an interpolation or addition method at a ratio relationship of the two largest signals received by the three adjacent driving-sensing electrodes 120 can be used to determine the corresponding coordinate value. The ratio relationship can be determined by the variation of the signal values received during the simulation process.

After the carbon nanotube touching functional layer 100 is formed, emulation tests can be performed at various locations to calculate the variation relationships between the signals received by each driving-sensing electrodes 120 and different touch locations. The relationships are built in a driving chip and can be used as the touch location determination basis when the user actually manipulates the carbon nanotube touching functional layer 100.

The signals received by every driving-sensing electrode 120 directly reflect a far or near of the touch locations because of the anisotropic impedance property of the carbon nanotube film 110. Therefore, the carbon nanotube touching functional layer 100 has a relatively superior sensing accuracy. The carbon nanotube touching functional layer 100 can also determine the touch location by directly reading the signal values received from the electrodes and comparing the signal values received by adjacent electrodes. Thus, the carbon nanotube touching functional layer 100 does not need a complicated driving method or a calculating program. In general, the carbon nanotube touching functional layer 100 proposed by the present embodiment has characteristics of simple structure, high sensing accuracy, and simple driving method.

The functional layer 20 can further include an anti-glare layer 200. The carbon nanotube touching functional layer 100 can be disposed between the anti-glare layer 200 and the first adhesive layer 30. The anti-glare layer 200 can directly cover the carbon nanotube touching functional layer 100. The anti-glare layer 200 includes an anti-glare substrate and an anti-glare film located on an upper surface of the anti-glare substrate. The anti-glare film has grains, and the surface of the anti-glare film has fine irregular objects composed by the aggregated grains or the analogy thereof. A material of the anti-glare substrate can be transparent plastic, such as tri-acetyl cellulose (TAC), thermoplastic polyester elastomer (TPEE), polyethylene terephthalate (PET), polyimide (PI), polyamide (PA), aromatic polyamide, polythylene (PE), polyacrylate (PAR), polyethersulfones, polysulfone, polypropylene (PP), diacetyl cellulose, polyvinylchlorid, polymethyl methacrylate (PMMA), polycarbonate (PC), epoxy resin, carbamide resin, polyurethane resin, and melamine resin. A thickness of the anti-glare substrate can be about 20 microns to about 100 microns. Besides, the anti-glare film can further include an agent as desired, such as a light stabilizer, UV absorbent, anlistatig agent, flame retardant, antioxidant, and so on. The grains are primarily aggregated on the common plane of the anti-glare film, to form a two dimensional aggregation. The two dimensional aggregation can form successively and moderately fluctuating fine irregular objects on the surface of the anti-glare film, to satisfy both the desired levels of the anti-glare property and contrast. An arithmetic mean value of roughness Ra of a roughness curve observed on the surface of the anti-glare film is about 0.05 microns to about 0.5 microns. The anti-glare property will be degraded when the arithmetic mean value of roughness Ra of the roughness curve is less than 0.05 micron, and the contrast will be degraded when the arithmetic mean value of roughness Ra of the roughness curve is greater than 0.5 microns.

In one embodiment, the carbon nanotube film 110 is directly disposed on the lower surface of the anti-glare substrate of the anti-glare layer 200. The first adhesive layer 30 is directly in contact with and adhered to the carbon nanotube film 110, thereby fixedly connecting the anti-glare layer 200 and the carbon nanotube film 110 to an upper electrode plate 620 of the e-paper display panel 10.

The e-paper display panel 10 can be a micro-capsule type electrophoretic display panel, micro cup electrophoretic display panel, gyricon bead type electrophoretic display panel, and partition type electrophoretic display panel.

The e-paper display panel 10 from bottom to top includes a lower electrode plate 610, an electrophoretic ink layer 630, and an upper electrode plate 620. The electrophoretic ink layer 630 is located between the upper electrode plate 620 and the lower electrode plate 610. The upper electrode plate 620 includes an upper substrate 622 and a common electrode layer 624 located on a lower surface of the upper substrate 622. The lower electrode plate 610 includes a lower substrate 612 and a pixel electrode layer 614 located on an upper surface of the lower substrate 612. The electrophoretic ink layer 630 is electrically contacting and attached between the common electrode layer 624 and the pixel electrode layer 614. The upper surface of the upper substrate 622 is the display surface of the e-paper display panel 10.

The upper electrode plate 620, the electrophoretic ink layer 630, and the lower electrode plate 610 cooperatively form a displaying layer. A material of the upper substrate 622 of the upper electrode plate 620 and the lower substrate 612 of the lower electrode plate 610 can be a transparent rigid material or flexible material, such as glass, crystal, plastic, and resin, and can be the same material as the anti-glare substrate of the anti-glare layer 200. The common electrode layer 624 of the upper electrode plate 620 is transparent and conductive. A material of the common electrode layer 624 can be indium tin oxide (ITO), conductive polymers, or a carbon nanotube layer. The carbon nanotube layer includes a plurality of uniformly distributed carbon nanotubes, and the plurality of carbon nanotubes can be disorderly aligned or aligned substantially along same direction. The pixel electrode layer 614 of the lower electrode plate 610 can include a plurality of thin film transistors. The electrophoretic ink layer 630 can include a bistable electronic ink displaying medium. In the microcapsule type electrophoretic display panel, the electrophoretic ink layer 630 includes a plurality of micro-capsules. Each micro-capsule can encapsulate a plurality of first electrophoretic particles and a plurality of second electrophoretic particles suspended in a fluid. The first electrophoretic particles and the second electrophoretic particles may have different charges. When a voltage is applied between the common electrode layer 624 and the pixel electrode layer 614, the first electrophoretic particles and the second electrophoretic particles will be separated and distributed at different sides of the micro-capsule under the action of the electric field. The electrophoretic ink layer 630 can be combined with the pixel electrode layer 614 and the common electrode layer 624 using an adhesive for example. The e-paper displaying panel 10 can further include a display driving circuit (not shown), to provide a driving voltage to the common electrode layer 624 and the pixel electrode layer 614.

In use, the user can operate the carbon nanotube touching functional layer 100 by touching the upper surface of the e-paper display device 500 with an electrically conductive tool, such as a finger, while watching the image displayed on the display surface of the e-paper display panel 10. Both the carbon nanotube touching functional layer 100 and the e-paper display panel 10 are driven by electrical signals. The contact capacitance between the carbon nanotube touching functional layer 100 and the user is detected to determine the touch location. However, a relatively large background capacitance may be produced by the common electrode layer 624 at the upper side of the e-paper displaying panel 10, to disturb or affect the detection of the contact capacitance by the carbon nanotube touching functional layer 100. To solve this problem, an effective spacing distance can be made between the carbon nanotube touching functional layer 100 and the common electrode layer 624 of the e-paper display panel 10. This effective spacing distance is determined by the capacitance property of the carbon nanotube film 110 to discern the contact capacitance at the touch location from the background capacitance. In one embodiment, a distance between the common electrode layer 624 of the e-paper display panel 10 and the carbon nanotube touching functional layer 100 is greater than 100 microns and an upper limit determined by the desired thickness and transparency of the e-paper display device 500. For example, the distance between the common electrode layer 624 of the e-paper display panel 10 and the carbon nanotube touching functional layer 100 can be equal to or less than 2 millimeters. In one embodiment, this distance ranges from about 125 microns to about 800 microns. In one embodiment, the upper substrate 622 of the e-paper display panel 10 may have a relatively large thickness (e.g., greater than 100 microns and equal to or less than 800 microns).

The first adhesive layer 30 is located on the upper surface of the upper substrate 622 between the functional layer 20 and the upper electrode plate 620, to fix the functional layer 20 to the upper electrode plate 620. A material of the first adhesive layer 30 can be a transparent optical clear adhesive or a UV adhesive.

Figure 9:
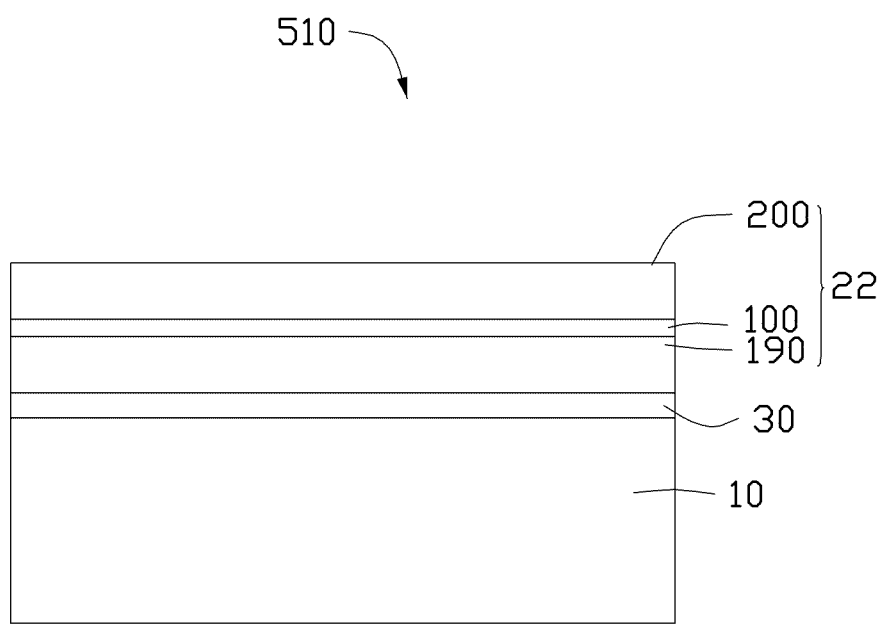
FIG. 9 is a schematic structural side view of another embodiment of an electronic paper display device.

Referring to FIG. 9, a second embodiment of a touch-control type e-paper display device 510, from bottom to top includes an e-paper displaying panel 10, a first adhesive layer 30, and a functional layer 22, in that order. The touch-control type e-paper display device 510 has a structure similar to the touch-control type e-paper display device 500 of the first embodiment, the difference being only the functional layer 22. The functional layer 202 from bottom to top includes a transparent spacing layer 190, a carbon nanotube touching functional layer 100, and an anti-glare layer 200. The transparent spacing layer 190 has an upper surface and a lower surface. The carbon nanotube film 110 of the carbon nanotube touching functional layer 100 is located on the upper surface of the transparent spacing layer 190. The first adhesive layer 30 is located on the lower surface of the transparent spacing layer 190. The transparent spacing layer 190 is located between the carbon nanotube touching functional layer 100 and the e-paper displaying panel 10.

A material of the transparent spacing layer 190 can be insulating transparent rigid material or flexible material, such as glass, crystal, plastic and resin, and can be the same as the material of the anti-glare substrate of the anti-glare layer 200. In one embodiment, the material of the transparent spacing layer 190 is PC. A thickness of the transparent spacing layer 190 is greater than 100 microns and equal to or less than 800 microns, so that there is a sufficient distance between the carbon nanotube touching functional layer 100 and the common electrode layer 624 of the e-paper displaying panel 10.

Figure 10:
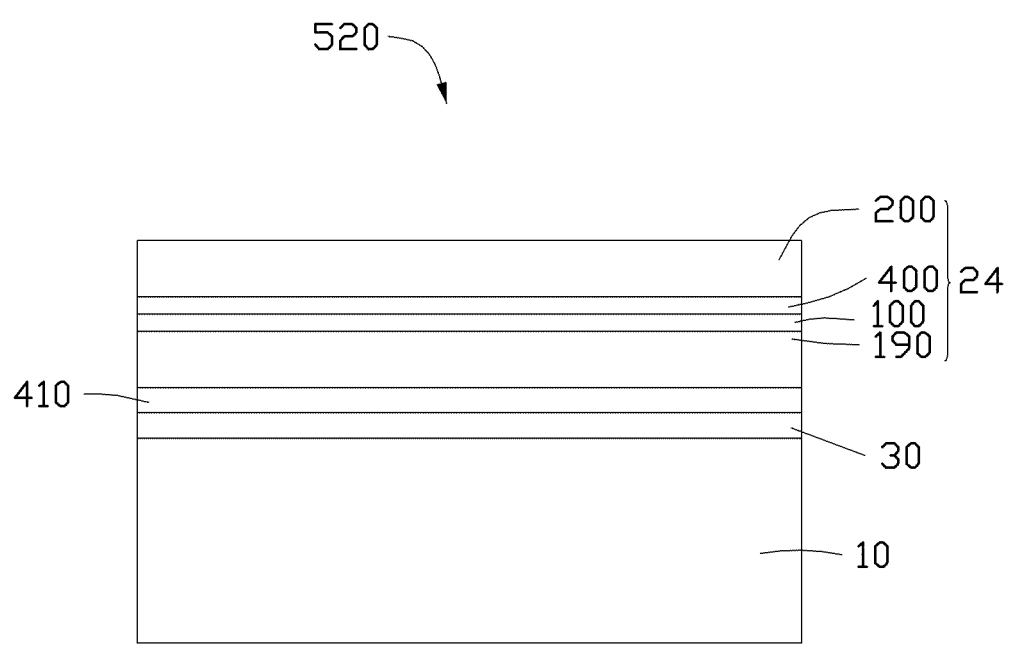
FIG. 10 is a schematic structural side view of another embodiment of an electronic paper display device.

Referring to FIG. 10, a third embodiment of a touch-control type e-paper display device 520 from bottom to top, includes an e-paper displaying panel 10, a first adhesive layer 30, and a functional layer 24. The e-paper display device 520 has a structure similar to the e-paper display device 510 of the first embodiment, the difference being only in the functional layer 24. The functional layer 24 includes a carbon nanotube touching functional layer 100, a transparent spacing layer 190, an anti-glare layer 200, and a waterproof layer 410.

The waterproof layer 410 can be located between any two layers of the carbon nanotube touching functional layer 100, the transparent spacing layer 190, and the anti-glare layer 200. In another embodiment, the waterproof layer 410 can also be located between the transparent spacing layer 190 and the e-paper displaying panel 10. The waterproof layer 410 is transparent and can prevent vapor penetration. A material of the waterproof layer 410 can be rubber, fluororesin, polychlorotrifluoroethylene (PCTFE), or polytrifluoroethylene. A thickness of the waterproof layer 410 can be about 0.5 microns to about 0.05 microns. In one embodiment, the thickness of the waterproof layer 410 is about 0.1 microns. The vapor can be water vapor or moisture in the air.

The functional layer 24 can further include a second adhesive layer 400. A material of the second adhesive layer 400 can be the same as the material of the first adhesive layer 30. The second adhesive layer 400 can be located between any two layers of the waterproof layer 410, the carbon nanotube touching functional layer 100, the transparent spacing layer 190, and the anti-glare layer 200.

In one embodiment, the functional layer 24 from bottom to top includes the waterproof layer 410, the transparent spacing layer 190, the carbon nanotube touching functional layer 100, the second adhesive layer 400, and the anti-glare layer 200. The transparent spacing layer 190 has an upper surface and a lower surface. The carbon nanotube film 110 of the carbon nanotube touching functional layer 100 is located on the upper surface of the transparent spacing layer 190. The waterproof layer 410 is located on the lower surface of the transparent spacing layer 190. The second adhesive layer 400 is located between the anti-glare layer 200 and the carbon nanotube film 110, and combines the carbon nanotube film 110 with the anti-glare substrate of the anti-glare layer 200.

In the present disclosure, the carbon nanotube touching functional layer has a relatively thin and transparent carbon nanotube film, and the carbon nanotube touching functional layer has a relatively simple structure. Thus, the carbon nanotube touching functional layer can avoid light from being blocked by conducting wires or metals. The carbon nanotube film has the anisotropic impedance property and the carbon nanotube wires are close to each other. Therefore, the touch-control type e-paper display device has a relatively high detecting accuracy. Furthermore, the common electrode layer of the e-paper display panel has enough separation from the carbon nanotube touching functional layer, and can avoid affecting the detection of the contact capacitance of the touch location by the background capacitance.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. An electronic paper display device comprising:
    an electronic paper display panel comprising a common electrode layer and a display surface; and
    a functional layer located on the display surface and comprising a carbon nanotube touching functional layer, a distance between the common electrode layer and the carbon nanotube touching functional layer is above 100 microns and equal to or less than 2 millimeters;
    wherein the electronic paper display panel comprises:
        a lower electrode plate comprising a lower substrate and a pixel electrode layer located on an upper surface of the lower substrate;
        an upper electrode plate comprising an upper substrate and a common electrode layer located on a lower surface of the upper substrate, a thickness of the upper substrate being greater than 100 microns and equal to or less than 800 microns; and
        an electrophoretic ink layer located between the lower electrode plate and the upper electrode plate.

2. The electronic paper display device of claim 1, wherein the functional layer further comprises a transparent spacing layer located between the electronic paper display panel and the carbon nanotube touching functional layer, a thickness of the transparent spacing layer is greater than 100 microns and equal to or less than 800 microns.

3. The electronic paper display device of claim 2, wherein a material of the transparent spacing layer is glass, crystal, plastic, or resin.

4. The electronic paper display device of claim 2, wherein a material of the transparent spacing layer is polycarbonate.

5. The electronic paper display device of claim 2, wherein the functional layer further comprises an anti-glare layer, the carbon nanotube touching functional layer is located between the anti-glare layer and the electronic paper display panel.

6. The electronic paper display device of claim 5, wherein the functional layer further comprises a waterproof layer located between any two layers of the transparent spacing layer, the carbon nanotube touching functional layer, and the anti-glare layer, or located between the transparent spacing layer and the electronic paper display panel.

7. The electronic paper display device of claim 6, wherein the functional layer further comprises a second adhesive layer located between any two layers of the transparent spacing layer, the carbon nanotube touching functional layer, the anti-glare layer, and the waterproof layer.

8. The electronic paper display device of claim 1, wherein the carbon nanotube touching functional layer comprises a carbon nanotube film and a plurality of driving-sensing electrodes electrically connected to the carbon nanotube film.

9. The electronic paper display device of claim 8, wherein the carbon nanotube film is an anisotropic impedance film having a low impedance direction and a high impedance direction, an impedance of the carbon nanotube film at the low impedance direction is smaller than an impedance of the carbon nanotube film at the high impedance direction.

10. The electronic paper display device of claim 9, wherein a ratio between an impedance of the carbon nanotube film at the high impedance direction and an impedance of the carbon nanotube film at the low impedance direction is in a range from 50 to 500.

11. The electronic paper display device of claim 9, wherein the carbon nanotube film comprises a plurality of carbon nanotubes substantially aligned along the low impedance direction.

12. The electronic paper display device of claim 11, wherein the plurality of driving-sensing electrodes are located on a side edge of the carbon nanotube film parallel to the high impedance direction.

13. The electronic paper display device of claim 12, wherein a length of the plurality of driving-sensing electrodes along the high impedance direction is in a range from about 1 millimeter to about 8 millimeters.

14. The electronic paper display device of claim 12, wherein a distance between adjacent driving-sensing electrodes of the plurality of driving-sensing electrodes is in a range from about 3 millimeters to about 5 millimeters.

15. The electronic paper display device of claim 12, further comprising at least one driving circuit connected to at least one of the plurality of driving-sensing electrodes to scan the part of the plurality of driving-sensing electrodes.

16. The electronic paper display device of claim 15, wherein the at least one driving circuit comprises a grounding unit and a scanning unit, and each of the plurality of driving-sensing electrodes is connected to at least one of the grounding unit and the scanning unit.

17. The electronic paper display device of claim 16, wherein the scanning unit comprising a charging circuit, a storage circuit, and a readout circuit, the charging circuit and the storage circuit are connected in parallel, and the readout circuit is connected to the storage circuit.

18. The electronic paper display device of claim 15, wherein the at least one driving circuit comprises a plurality of driving circuits connected to the plurality of driving-sensing electrodes in a one to one manner.

19. The electronic paper display device of claim 15, wherein the at least one driving circuit comprises a plurality of driving circuits connected to the plurality of driving-sensing electrodes in a one to more manner.

\* \* \* \* \*